US006506471B2

(12) United States Patent
Doppelt

(10) Patent No.: US 6,506,471 B2
(45) Date of Patent: Jan. 14, 2003

(54) METHOD OF COVERING A HOT OUTDOOR GRILLS

(76) Inventor: Jerald Doppelt, 12 Skyline Dr., North Caldwell, NJ (US) 07006

(*) Notice: Subject to any disclaimer, the term of this patent is extended or adjusted under 35 U.S.C. 154(b) by 30 days.

(21) Appl. No.: 09/737,422

(22) Filed: Dec. 18, 2000

(65) Prior Publication Data

US 2002/0076521 A1 Jun. 20, 2002

(51) Int. Cl.$^7$ .................................................. B32B 3/06

(52) U.S. Cl. ........................ 428/102; 150/165; 442/152; 442/153

(58) Field of Search .......................... 428/102, 57, 920, 428/922; 52/23, 4, 3, 79.1; 150/165, 166, 154, 901; 99/422; 442/136, 152, 153

(56) References Cited

U.S. PATENT DOCUMENTS 6,058,658 A * 5/2000 Dunn ............................ 52/23

* cited by examiner

*Primary Examiner*—Harold Pyon
*Assistant Examiner*—Jane J Rhee
(74) *Attorney, Agent, or Firm*—Lilly & Lilly P.C.

(57) ABSTRACT

The invention relates to a method of covering a hot outdoor grills. It comprises a cotton flannel material on which an aluminized vinyl is coated on the surface. This material is resistant to excessive heat and can also repel water.

23 Claims, 1 Drawing Sheet

METHOD OF COVERING A HOT OUTDOOR GRILLS

FIELD OF THE INVENTION

This invention relates to the outdoor leisure industry and, in particular, to covers that may be placed on hot outdoor grills.

BACKGROUND OF THE INVENTION

During the warmer months of the year, one of the most popular ways to cook is by the use of outdoor grills, both those using propane gas and those using more traditional charcoal. Further, outdoor cooking is starting to become an all year round popular activity. Many ski resorts have very popular outdoor barbecues during the ski season. Caterers, restaurants and hotels all use barbecues for entertaining customers and making the cooking process more appealing. All of these outdoor grills, however, suffer from the same problem. When the cooking is completed, the grill remains hot for quite some time, usually hours.

One of the problems caused by the length of time that the grill stays hot is the fact that the grills cannot be covered after use. The grill covers that are available in the marketplace cannot be placed on hot grills. If this was done, the materials would melt. In addition, such covers can catch fire, disintegrate, warp, crack and generally create a dangerous, unsafe condition.

Grill covers are extremely important, however. Without these covers, over a period of time, the wind and rain and nature's elements will cause the outer surface of the grill to deteriorate. Without protection, the useful life of a grill, especially less expensive ones, may amount to only a single season or sometimes two. Accordingly, it is very common for people to use grill covers in order to extend the useful life of the grills.

A problem with the conventional outdoor grill covers is that they cannot be placed on hot grills. It is necessary to wait many hours until the grill cools. Frequently, this results in the grill not being covered, because the user of the grill was unable to wait around until the grill cooled and thus had no opportunity to cover the grill.

Therefore, there is a need in the industry for an outdoor grill cover that may be placed on hot barbecue grills.

SUMMARY OF THE INVENTION

Therefore, it is an object of the invention to provide an outdoor grill cover that may be placed on a hot barbecue grill, even immediately after cooking. This is accomplished by using a cotton flannel grill cover on which an aluminized vinyl is coated on the topside. Such a material is heat resistant and can also repel water. Accordingly, it will not melt or deteriorate from contact with hot grills, and also has the ability to repel water during a rainstorm.

BRIEF DESCRIPTION OF THE INVENTION

DETAILED DESCRIPTION OF THE INVENTION

Figure 1:
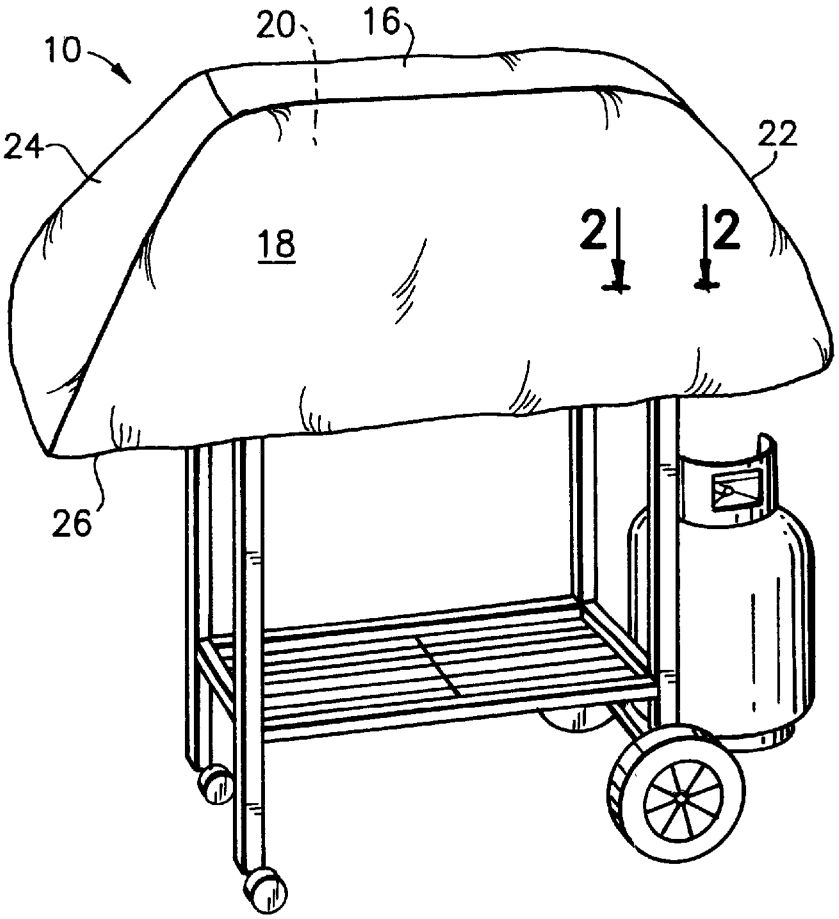
FIG. 1 is a perspective view of the cover for a hot outdoor grill of this invention in position on top of an outdoor grill.
Figure 2:
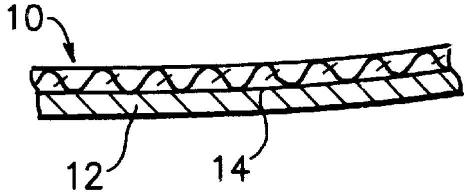
FIG. 2 is a cross sectional view of the cover for a hot outdoor grill that is the subject matter of this invention.

This invention constitutes a new use of a known material. Known in the industry is a cotton flannel material which has an aluminized vinyl coating on one of its surfaces. It is sewn together with a fire retardant thread that is commonly used on children's apparel. This particular material is both resistant to excessive heat and repels water. Heretofore, it was not known that such a material would be useful as a cover for a hot outdoor grill.

The outdoor grill cover 10 of this invention is made generally of a cotton flannel material. In the preferred embodiment, it has a twill weave and is made of spun yarn. Preferably, fire retardant thread is used to sew the cover together, so that there is even less chance of the grill decomposing due to excessive heat or fire.

In any known manner, aluminized vinyl 12 is coated on the top surface 14 of the cover 10. One way to accomplish this is by the "blade in air" coating process. According to this process, the cotton flannel material of the cover is suspended on and rolls over the surface of a roller. Opposite the roller, there is an applicating device which coats the aluminized vinyl on the cotton flannel material in the prescribed manner. This is well known in the industry.

The preferred weight of the cover is nine ounces per yard, and the preferred range of weights is between 8 and 10 ounces per yard, but the cover may have a weight anywhere between 4 and 20 ounces per yard. Its shrinkage factor should generally be in the three-five percent range. In the preferred embodiment of the invention, mildew inhibitors may be impregnated into the cover. For purposes of the invention, about 0.06±10% ounces of aluminized vinyl is used, but the cover will work adequately when the aluminized vinyl constitutes 20% of the weight.

Generally speaking, the cover will be made in any number of standard sizes, so that it will fit a plurality of grills of different shapes and sizes. In each case, though made of a single unitary piece, the cover 10 will have a top 16 that is disposed against the top portion of the hot grill. Then, there will be downwardly depending front portion 18, rear portion 20, right portion 22 and left portion 24. The bottom of the cover will be open, so that the cover can fit over the grill. It may also be appreciated that the cover for a hot barbecue grill could work equally well on free-standing stoves, ovens or other cooking units.

In some embodiments, it may be desirable to have an elasticized band 26 at the open end of the cover, so that the cover can be held tightly around the grill. In other embodiments, instead of an elasticized band, there may be a cord of some type, which is enclosed within a channel around the bottom of the cover, so that the two ends of the cord can be pulled together to close the cover about the grill. Velcro® tabs may be used to hold the ends together or any other type of fabric tie may be used.

Tongue tear is defined in the industry as a measure of the ability of the fabric to resist rupture by tearing. In the preferred embodiment, the tongue tear of the warp of the cover is 6.5±20%.

In the industry, the term hydrostatic resistance is used as a measure of the ability of the fabric to resist water penetration through pressure. A vertical tube is held on top of the fabric. Water is added until three drops of water appear. The higher the water, measured in inches, the greater the pressure the water exerts on the fabric. To perform a test of the hydrostatic resistance of a fabric, test specimens are mounted under a conical well and are subject to increasing water pressure by raising a water supply at a constant rate until three points of leakage appear on the under surfaces of the specimens. When the three points of leakage are observed, the upward motion of the water supply is stopped and its height is measured to the nearest 0.1 cm. In the preferred embodiment, the hydrostatic resistance is 39 cm±20%.

The spray rating is used in the industry to determine the amount of water that can penetrate the fabric when it is sprayed. The best rating is 100 and, in the preferred embodiment, the cover should have a spray rating of 100, the acceptable range is 75 to 100. To determine the spray rating, test specimens are mounted in an embroidery hoop, so that they present a smooth and wrinkle-free surface. They are mounted at a 45° angle under a spray nozzle and 250 ml of water are allowed to flow through the spray apparatus and impact the face of the test specimen. A rating is assigned by comparing the wetted pattern on the sample to pictures on a standard chart used in the industry.

In the preferred embodiment, a standard bag test should be applied to the outdoor grill cover. This procedure involves mounting holes being punched into the edges of the test specimen using an appropriate template, as known in the industry. Specimens are then mounted in the test rack to form a sagged area and this depression is filled with the appropriate amount of tap water. The specimens are observed for eight hours to determine if there is any wetting out and/or leakage. A specimen passes the test if no water penetrates and drops off the underside after eight hours. The outdoor grill covers of this invention should ideally be able to pass the bag test.

Tensile strength is the measure of the ability of the fabric to resist breaking by tension. It is sometimes referred to as "grab breaks" in the industry. In the preferred embodiment, the grab break per pound of the warp is 81±20% and the grab break of the fill is 87±20%.

In preferred embodiments, it is desirable to make the hot outdoor grill cover washable. This is because, over time, there will be a build up of soot, grease and food residue. Necessarily, an unsanitary condition will be created unless the cover can be cleaned.

The cover, which is substantially of a cotton flannel material, albeit with an aluminized coating, can be made machine washable. Then, with a mild detergent, the cover for the outdoor grill can be cleaned. This is an important additional advantage, as the grill covers on the market are typically not washable.

Alternatively or additionally, such a cover can be hand wiped. This will be sufficient in most instances. Over time, however, even hand wiping may not be sufficient, as the build up of soot, grease, food residue, etc. may be too great and a more thorough cleaning will be required.

It may also be appreciated that, while this invention is primarily directed to covering hot outdoor grills and similar cooking devices, the cover may also be used for covering any surface which encloses a source of heat.

The invention is described in detail with reference to a particular embodiment, but it should be understood that various other modifications can be effected and still be within the spirit and scope of the invention.

I claim:

1. A method for covering a hot outdoor grill comprising the steps of: (a) fabricating a cover for a hot outdoor grill from a cotton flannel fabric on which aluminized vinyl is coated on a top surface, wherein said cover has a weight of between 4 and 20 ounces per yard and a shrinkage factor of between three and five percent, said cover is resistant to high heat and is water repellant, and said aluminized vinyl between 10 and 20% of the total weight of said cover; and (b) using said cover to cover and protect the protect the outdoor grill while the temperature of said hot grill is in excess of 110° F., wherein the cotton flannel fabric surface of said cover is laid on and touches the hot outdoor grill when said cover is in position to cover and protect the hot outdoor grill; whereby said cover does not melt or burn when in contact with said hot outdoor grill.

2. A method for covering a hot outdoor grill according to claim 1, wherein fabricating said cover comprises selecting a weight of between 4 and 20 ounces per yard and a shrinkage factor of between three and five percent, and making the cover resistant to high heat and water repellant.

3. A method for covering a hot outdoor grill according to claim 1, wherein fabricating said cover further comprises sewing the cover with fire resistant thread.

4. A method for covering a hot outdoor grill according to claim 1, wherein fabricating said cover comprises selecting a hydrostatic resistance of 39 centimeters for said cover.

5. A method for covering a hot outdoor grill according to claim 1, wherein fabricating said cover comprises selecting a spray rating of 100 for said cover.

6. A method for covering a hot outdoor grill according to claim 1, wherein fabricating said cover comprises selecting the tongue tear of the warp of said cover as 80.

7. A method for covering a hot outdoor grill according to claim 1, wherein fabricating said cover comprises selecting a weight between 8 and 10 ounces per yard for said cover.

8. A method for covering a hot outdoor grill according to claim 1, wherein fabricating said cover comprises selecting alminized vinyl between 10 and 20% of the total weight of said cover.

9. A method for covering a hot outdoor grill according to claim 1, wherein fabricating said cover comprises selecting a grab break per pound of the warp as 81 and the grab break of the fill as 87 for said cover.

10. A method for covering a hot outdoor grill according to claim 1, wherein fabricating said cover comprises impregnating mildew inhibitors into said cover.

11. A method for covering a hot outdoor grill according to claim 1, wherein fabricating said cover comprises coating 0.06 ounces of aluminized vinyl on said cotton flannel fabric.

12. A method for covering a hot outdoor grill comprising the steps of: coating aluminized vinyl on a top surface of a cotton flannel fabric; fabricating a cover for a hot outdoor grill from said cotton flannel fabric coated with said aluminized vinyl, wherein said cover has a weight of between 4 and 20 ounces per yard and a shrinkage factor of between three and five percent, said cover is resistant to high heat and is water repellant, and said aluminized vinyl is between 10 and 20% of the total weight of said cover; and covering the outdoor grill while the temperature of said hot grill is in excess of 110° F. with said cover, wherein the cotton flannel fabric surface of said cover is laid on and touches the hot outdoor grill; whereby said cover does not melt or burn when in contact with said hot outdoor grill.

13. A method for covering a hot outdoor grill comprising the step of covering the outdoor grill while the temperature of said hot grill is in excess of 110° F. with a cover fabricated of a cotton flannel fabric on which aluminized vinyl is coated., wherein said cover has a weight of between 4 and 20 ounces per yard and a shrinkage factor of between three and five percent, said cover is resistant to high heat and is water repellant, and said aluminized vinyl is between 10 and 20% of the total weight of said cover; wherein the cotton flannel fabric surface of said cover is laid on and touches the hot outdoor grill; whereby said cover does not melt or burn when in contact with said hot outdoor grill.

14. A method for covering a hot outdoor grill according to claim 13, further comprising selecting a weight of said cover between 4 and 20 ounces per yard and a shrinkage factor of between three and five percent, and making the cover resistant to high heat and water repellant.

15. A method for covering a hot outdoor grill according to claim 13, further comprising sewing the cover with fire resistant thread.

16. A method for covering a hot outdoor grill according to claim 13, further comprising selecting a hydrostatic resistance of 39 centimeters for said cover.

17. A method for covering a hot outdoor grill according to claim 13, further comprising selecting a spray rating of 100 for said cover.

18. A method for covering a hot outdoor grill according to claim 13, further comprising selecting a tongue tear of the warp of said cover as 80.

19. A method for covering a hot outdoor grill according to claim 13, further comprising selecting a weight between 8 and 10 ounces per yard for said cover.

20. A method for covering a hot outdoor grill according to claim 13, further comprising selecting aluminized vinyl between 10 and 20% of the total weight of said cover.

21. A method for covering a hot outdoor grill according to claim 13, further comprising selecting a grab break per pound of the warp as 81 and the grab break of the fill as 87 for said cover.

22. A method for covering a hot outdoor grill according to claim 13, further comprising impregnating mildew inhibitors into said cover.

23. A method for covering a hot outdoor grill according to claim 13, further comprising coating 0.06 ounces of aluminized vinyl on said cotton flannel fabric of said cover.

* * * * *